United States Patent
Trani et al.

(10) Patent No.: US 9,986,010 B2
(45) Date of Patent: May 29, 2018

(54) SYSTEM AND METHOD FOR CONTROLLING VIDEO AND/OR AUDIO STREAMS IN A WEB BROWSER

(71) Applicant: Sensormatic Electronics, LLC, Boca Raton, FL (US)

(72) Inventors: James Trani, Billerica, MA (US); Andrew Furtado, Dracut, MA (US); Teresa J. Seeley, Littleton, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 288 days.

(21) Appl. No.: 14/869,707

(22) Filed: Sep. 29, 2015

(65) Prior Publication Data

US 2017/0093950 A1    Mar. 30, 2017

(51) Int. Cl.
*G06F 15/16* (2006.01)
*H04L 29/06* (2006.01)

(52) U.S. Cl.
CPC .......... *H04L 65/608* (2013.01); *H04L 65/602* (2013.01); *H04L 65/80* (2013.01)

(58) Field of Classification Search
CPC ...... H04L 65/608; H04L 65/602; H04L 65/80
See application file for complete search history.

(56) References Cited

U.S. PATENT DOCUMENTS

| | | | |
|---|---|---|---|
| 6,728,263 B2* | 4/2004 | Joy ......................... | H04L 29/06 370/395.21 |
| 7,599,395 B1* | 10/2009 | Wolf .................... | H04N 21/236 370/470 |
| 7,826,487 B1* | 11/2010 | Mukerji ................ | H04L 43/026 370/394 |
| 7,934,007 B2* | 4/2011 | Wang ................... | H04L 12/1868 709/230 |
| 7,978,604 B2* | 7/2011 | Tidwell ................. | H04L 1/0007 370/231 |

(Continued)

OTHER PUBLICATIONS

Durresi et al., "RTP, RTCP, and RTSP—Internet Protocols for Real-Time Multimedia Communication," The Industrial Information Technology Handbook. 2005, 28-1-28-11. Boca Raton: CRC Press LLC.

(Continued)

*Primary Examiner* — Moustafa M Meky
(74) *Attorney, Agent, or Firm* — HoustonHogle LLP (57) ABSTRACT

A system and method for controlling video and/or audio streams between a client and server over a communications channel is disclosed that utilizes an application layer streaming communications protocol that includes features of current pull and push style application layer streaming protocols. Using the streaming protocol, client applications on user devices such as web browsers send request messages for streams, where the request messages specify a variable number of data packets of the streams for the server to send. Each of the data packets include one or more frames, or frame data, of the streams. The streaming server then "pushes" the requested number of data packets of the streams, and the client application can adjust the number of data packets for the server to send in subsequent stream request messages to optimize the bandwidth of the communications channel.

20 Claims, 4 Drawing Sheets

(56) References Cited

U.S. PATENT DOCUMENTS

| | | | |
|---|---|---|---|
| 8,468,458 B2* | 6/2013 | Lee | G06F 3/04883 |
| | | | 715/745 |
| 8,625,638 B2* | 1/2014 | Wiegand | H04L 29/06027 |
| | | | 370/477 |
| 9,183,090 B2* | 11/2015 | Spencer | H04L 65/4084 |
| 9,276,856 B2* | 3/2016 | Spencer | H04L 47/25 |
| 9,654,405 B2* | 5/2017 | Yang | H04L 47/32 |
| 9,712,580 B2* | 7/2017 | Watson | H04L 65/4069 |
| 2002/0093982 A1* | 7/2002 | Joy | H04L 29/06 |
| | | | 370/468 |
| 2007/0297331 A1* | 12/2007 | Tidwell | H04L 1/0007 |
| | | | 370/232 |
| 2013/0125063 A1* | 5/2013 | Lee | G06F 3/04883 |
| | | | 715/854 |
| 2014/0112354 A1* | 4/2014 | Yin | H04L 65/605 |
| | | | 370/476 |
| 2015/0215223 A1* | 7/2015 | Spencer | H04L 47/365 |
| | | | 370/471 |
| 2016/0142330 A1* | 5/2016 | Yang | H04L 47/32 |
| | | | 370/231 |

OTHER PUBLICATIONS

Schulzrinne et al., "Real Time Streaming Protocol (RTSP)," Network Working Group: Standards Track. 1998: The Internet Society.

* cited by examiner

SYSTEM AND METHOD FOR CONTROLLING VIDEO AND/OR AUDIO STREAMS IN A WEB BROWSER

BACKGROUND OF THE INVENTION

When frames of audio and video are streamed across computer networks, the networks are often unable to perform at desired data rates. In one example, the streaming performance is impacted due to network devices in the communications channel between clients that request the streams and servers that provide the streams. Routers can introduce delays due to buffer overflows in the routers as traffic increases, especially for burst prone networks such as Internet Protocol (IP) networks. Links between devices can also have data rate limitations.

More often, however, the streaming performance is impacted due to inherent limitations of current application layer network protocols utilized to request and transmit data packets of the streams that include the frame data of the streams. Current application layer protocols for streaming video are typically of two types, known as pull and push. With pull protocols, clients such as applications running on user devices send request messages for individual frames from a streaming server. The server provides the frames in response to each request. Push protocols, in contrast, are associated with the server sending multiple frames of the streams whenever the frames become available on the server, i.e. in an unsolicited fashion. Because of their different nature, pull and push protocols have different advantages and disadvantages.

An advantage of pull protocols is that the client applications can calculate the bandwidth utilization of the communications channel, based on how long it takes for data packets of the streams to arrive after being requested. A significant disadvantage of pull protocols, however, is the additional message traffic and message overhead due to the solicited and iterative request/response nature of the pull protocols. This can impact the frame rate, in frames per second, of the frames of the audio and video streams sent from the client applications to the server over the communications channel. Client applications that run in a web browser, for example, typically use pull protocols for obtaining audio and video streams from a streaming server.

The major advantage of push protocols is their ability to sustain higher frame rates due to the significantly lower amount of message traffic and overhead as compared to pull protocols. Unlike pull protocols, however, client applications receiving streams via push protocols cannot calculate the bandwidth utilization of the communications channel over which the streams are transmitted/pushed.

SUMMARY OF THE INVENTION

A system and method for controlling video and/or audio streams between a client and server over a network communications channel is presented. The application layer streaming communications protocol includes features of current pull- and push-style application layer streaming protocols.

The system and method can be used to provide the ability for client applications such as web browsers running on the user devices to dynamically throttle the data packets of the video and/or audio streams. For example, client applications on the user devices such as web browsers send solicited request messages for streams from a streaming server over a communications channel, such as Ethernet datagrams send over an IP network. The request messages specify a variable number of data packets for the server to send. Each of the data packets include one or more frames or partial frames, or frame data, of the streams. The streaming server then "pushes" the requested number of data packets of the streams in response to each stream request message. The number of data packets of each stream requested by the client is also known as the bundle size of the data packets, and the virtual set of data packets themselves sent by the server in response is referred to as a bundle of the data packets. The use of bundles allows client applications to use a single request to retrieve multiple data packets from the streaming server with minimal client to server communication.

After receiving the data packets of each bundle, the client application then calculates the bandwidth utilization of the communications channel based on the response time for the data packets of each bundle. Based on this calculation, the client application can upwardly or downwardly adjust the bundle size for remaining data packets of the streams in subsequent stream request messages for additional data packets of the streams. In this way, the client applications can optimize the bandwidth of the communications channel for receiving data packets of the streams, which correspondingly optimizes the frame rate of the frame data sent from the streaming server to the client application.

In general, according to one aspect, the invention features a video streaming system, comprising a streaming server that transmits a bundle of data packets of one or more video and/or audio streams over a communications channel in response to stream request messages for each of the streams and a client application that sends the stream request messages, wherein each of the stream request messages includes a bundle size of the bundle of data packets of each stream for the streaming server to transmit.

In embodiments, the client application optionally adjusts the bundle size in the stream request messages in response to determining an available bandwidth of the communications channel. This available bandwidth of the communications channel can be determined by a response time for the client application to receive the bundle of data packets of a stream transmitted by the streaming server. The client application can adjust the bundle size in the stream request messages in response to determining the available bandwidth of the communications channel.

In one implementation, the streaming server is a network video recorder and the streams are generated by security cameras. The client application can execute in a web browser of a user device.

Further, the communications channel can utilize Realtime Transport (RTP) to reduce fragmentation of the stream request messages sent by the client application and the data packets of the streams transmitted by the streaming server. The streaming server transmits the bundle of data packets of the one or more video and/or audio streams over the communications channel via a push mechanism.

In one implementation, the client application can send a message for the streaming server to adjust a transcode resolution of frame data of the data packets of a subsequent bundle, in response to the client application determining an available bandwidth of the communications channel and determining a transcode resolution of frame data of the data packets of a received bundle.

In another implementation, the client application can send a message for the streaming server to adjust a transcode resolution of frame data of the data packets of a subsequent bundle, in response to the client application determining an available bandwidth of the communications channel and in response to user viewing preferences. Finally, the streaming server can cull one or more instances of frame data from the data packets of the bundle to be transmitted to optimize bandwidth of the communications channel.

In general, according to another aspect, the invention features a video streaming method. This method comprises transmitting a bundle of data packets of one or more video and/or audio streams over a communications channel in response to stream request messages for each of the streams. Then, based on receipt of the bundle of data packets, a size of the bundle specified in subsequent stream request messages is updated.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 2A-2C are sequence diagrams that show how a web browser client application running on the user device optimizes the bandwidth of the communications channel in response to (calculating) the (calculated) response time of bundles of data packets sent from the streaming server, where

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items.

Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
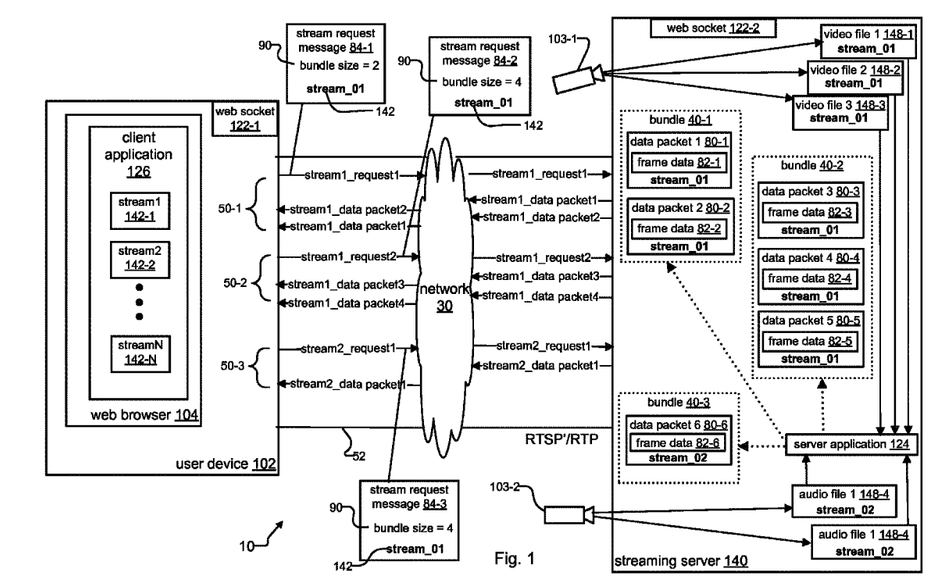
FIG. 1 is a block diagram of an audio and video streaming system, where a client application on a user device and a streaming server use an application layer streaming protocol for requesting and providing the streams over a communications channel, according to the present invention.

FIG. 1 shows a video and/or audio streaming system 10 including a user device 102 that communicates with a streaming server 140 via a communications channel 52. The communications channel 52 enables transmission and reception of control messages and data between the user device 102 and the streaming server 140 over a network 30, such as the internet. Examples of the user device 102 include mobile phones, tablet devices, and computer workstations, in different implementations.

Each user device 102 includes a web browser 104 or other application executing on the processor of the user device 102. A client application 126 running in the browser 104 or directly on the device's operating system opens its web socket 122-1 to enable communications between the client application 126 and hardware/firmware of the user device 102 that interfaces with the communications channel 52.

The streaming server 140 includes a server application 124 that runs on a processor of the server and a web socket 122-2. The server application 124 opens its web socket 122-2 to enable communications between the server application 124 and hardware/firmware of the streaming server 140 that interfaces with the communications channel 52.

The streaming server 140 receives exemplary audio and video files 148 associated with streams from security cameras 103 in one example. The server application converts the audio and video files into data packets 80 of the streams, where the size and format of the data packets are in accordance with the maximum transmission unit (MTU) and protocol of the communications channel (e.g. Ethernet). Each of the data packets 80 includes partial or one or more frames of video and/or audio from the files 148, encoded as frame data 82 within the data packets 80.

Security camera 103-1 sends video files 1-3 with references 148-1 through 148-3 to the streaming server 140. Security camera 103-2 also sends audio files 1 and 2 with references 148-4 and 148-5 to the streaming server 140.

The client application 126 and streaming server 140 then use an application layer streaming communications protocol to request and deliver the streams over the communications channel 52. The streaming protocol is based upon Real Time Streaming Protocol (RTSP). Preferably, the streaming protocol utilizes Real-time Transport Protocol (RTP) as a transport layer protocol. In one example, the use of RTP as a transport layer reduces network fragmentation over the communications channel 52 because of the relatively small data packet sizes that RTP supports. For this reason, the streaming protocol described herein below and in the figures is referred to as "RTSP'/RTP" to indicate that the protocol is a modified or enhanced version of RTSP, and that it preferably runs on top of standard RTP.

In response to the server application 124 receiving the audio and/or video files 148 of the streams, the server application 124 generates data packets 80 (e.g. RTP data packets) that include frame data 82 extracted from the files 148. For files 148-1 through 148-3 from security camera 103-1, the server application 124 generates data packets 1 through 5 with references 80-1 through 80-5, which in turn include frame data 82-1 through 82-5, respectively. For files 148-4 and 148-5 from security camera 103-2, the server application 124 generates data packet 6 with reference 80-6 that includes frame data 82-6.

Client application 126 sends stream request message 84-1 to initiate requests for data packets 80 of stream 1. The request message 84-1 includes a stream ID 142 specifying "stream_01", and includes a value for the bundle size 90 of data packets 80. For the purpose of this illustrative example, the initial value of the bundle size 90 in stream request message 84-1 is set to 2.

In response to stream request message 84-1, the streaming server "pushes" data packets 80-1 and 80-2 as part of bundle 40-1 over the communications channel 52. Each bundle 40 is a virtual set of ordered data packets 80 of a stream sent by the server 140. The number of data packets 80 "included" in a bundle (e.g. the number of data packets 80 that the server 140 transmits in response to a stream request message 84) is defined by the bundle size 90 of each stream request message 84 received on the server 140. The use of bundles 40 allows the client application 126 to use a single request to retrieve a multiple set of continuous data packets 80 of a stream from the server 140 with minimal client to server communication.

In response to receiving the data packets 80-1 and 80-2 of bundle 40-1, the client application 126 determines the bandwidth of the communications channel 52 utilized for transmitting the bundle 40-1. The bandwidth utilized for transmitting each bundle 40 is determined by calculating the response time 50 for receiving each bundle 40. Response times 50-1, 50-2, and 50-3 are calculated in response to receiving bundles 40-1, 40-2, and 40-3, respectively. The response time 50, in one example, accounts for propagation delays associated with links or hops in the network 30 that comprise the communications channel 52.

In the example, the client application 126 determines that the response time 50-1 for receiving bundle 40-1 is indicative of an under-utilized communications channel 52. In response, the client application 126 upwardly adjusts the bundle size 90 to value "4" in the next stream request message 84-2 for the remaining data packets 80 of stream 1. The client application 126 increases the bundle size 90 in order for the server 140 to more efficiently utilize the bandwidth of the communications channel 52 when transmitting the data packets 80 of the next bundle, which is bundle 40-2. Because there are fewer data packets 80-3 through 80-5 remaining on the server 140 for stream 1 than the specified bundle size 90 value of 4, the remaining data packets 80-3 through 80-5 of stream 1 sent to the client application 126 in bundle 40-2 complete transmission of stream 1.

In response to receiving the data packets 80-3 through 80-5 of bundle 40-2, the client application 126 determines the bandwidth of the communications channel 52 utilized for transmitting the bundle 40-2 by calculating the response time 50-2 for receiving bundle 40-2. In this example, the client application 126 determines that the bandwidth of the communications channel 52 utilized for transmitting bundle 40-2 is sufficiently utilized, and therefore maintains the current bundle size 90 value of 4 to use in a subsequent stream request message 84.

In a similar fashion, client application 126 sends stream request message 84-3 to initiate requests for data packets 80 of stream 1. The request message 84-1 includes a stream ID 142 specifying "stream_02", and includes the current value of "4" for the bundle size 90 of data packets 80. In response to receiving data packets 80-6 of bundle 40-3, the client application 126 determines the bandwidth of the communications channel 52 utilized for transmitting the bundle 40-3 by calculating the response time 50-3 for receiving bundle 40-3. Based on the response time 50-3 calculation, the client application 126 can either increase, maintain, or decrease the bundle size 90 for subsequent data packets 80 of the streams in response to network conditions associated with the communications channel 52.

The client application 126 can then display the streams (e.g. the frame data of the streams) within the web browser 104 of the user device 102.

Figure 2A:
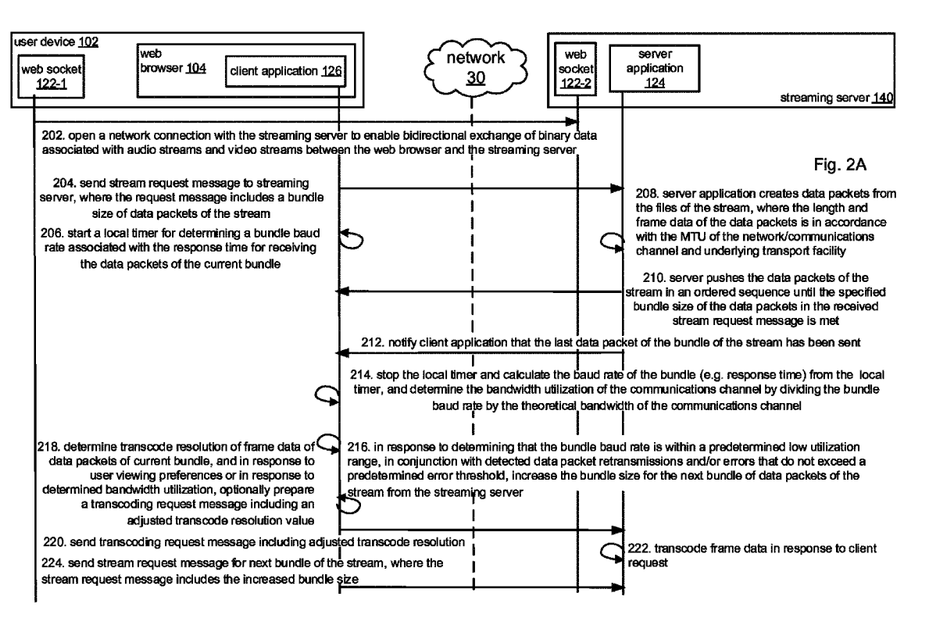
FIG. 2A shows the browser increasing the bundle size of the next requested data packets of a stream in response to determining that the communications channel is underutilized, where
Figure 2B:
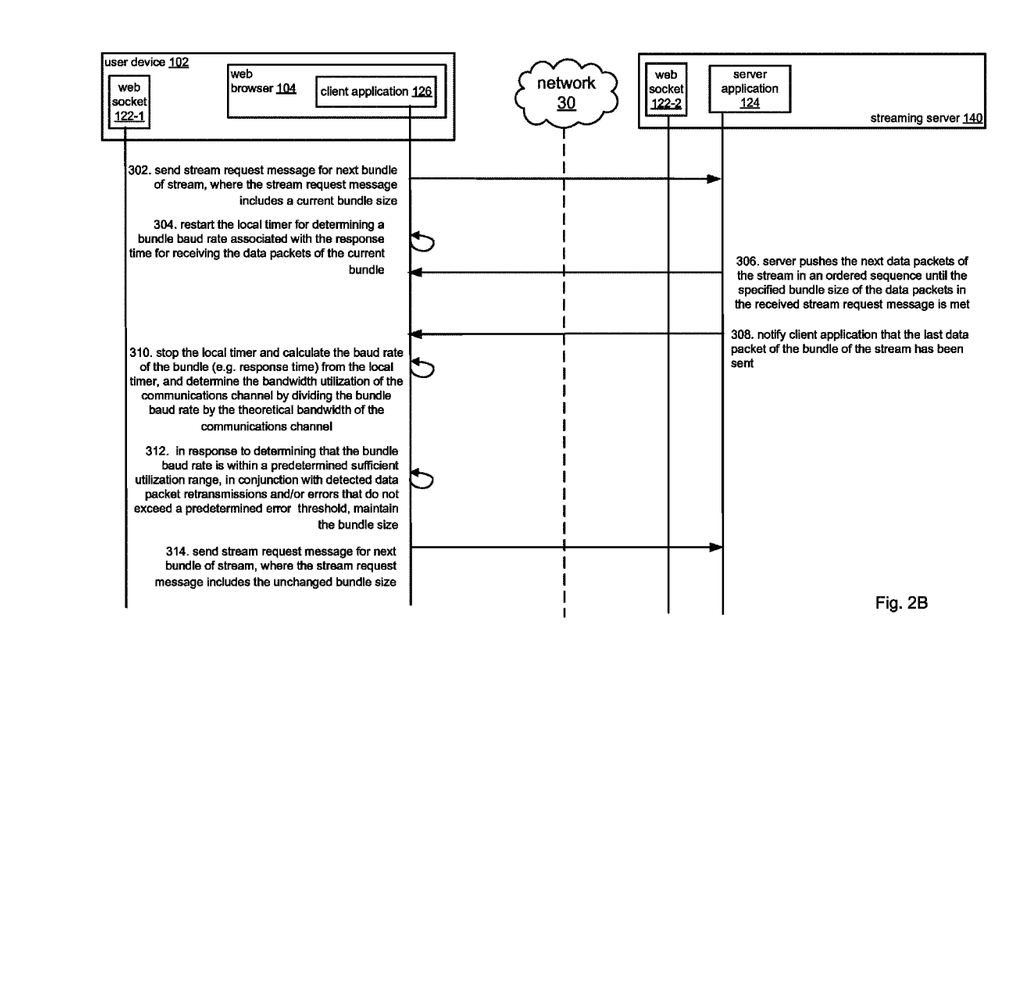
FIG. 2B shows how the browser maintains the current bundle size for the next requested data packets of the stream in response to determining that the communications channel is sufficiently utilized, and where
Figure 2C:
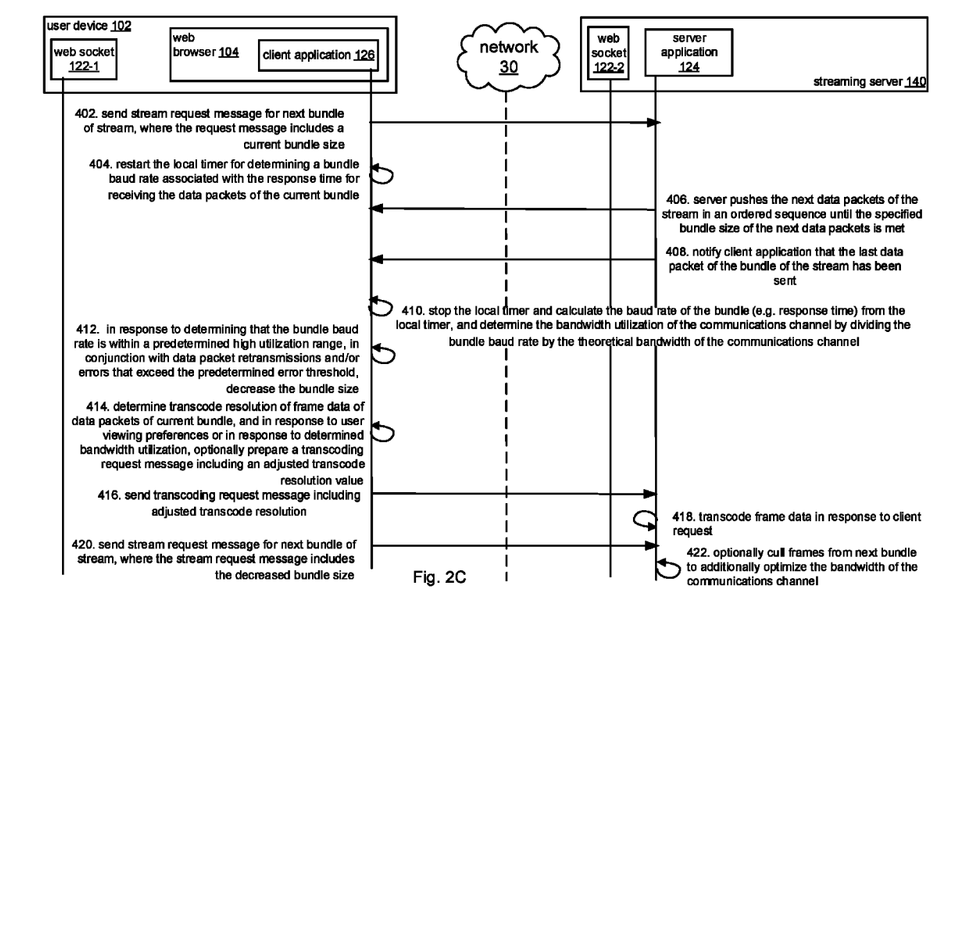
FIG. 2C shows how the browser decreases the bundle size for the next requested data packets of the stream in response to determining that the communications channel is over-utilized.

FIGS. 2A-2C describe example network conditions associated with transmission of data packets 80 across the communications channel 52. Specifically, FIG. 2A through 2C, respectively, show conditions where a client application 126 running in browser 104 on a user device 102 increases, maintains, and/or decreases the bundle size 90 in subsequent stream request messages sent to the streaming server 140.

In step 202, via web socket 122-1, the client application 126 opens a network connection with the streaming server 140 via the web socket 122-2 of the streaming server 140 to enable bidirectional exchange of binary data associated with audio streams and video streams between the web browser 104 and the streaming server 140. In step 204, the client application sends a stream request message 84 to the streaming server 140, where the request message 84 includes a bundle size 90 of data packets 80 of the stream.

Then, in step 206, the client application 126 starts a local timer for determining a bundle baud rate associated with the response time 50 for receiving the data packets 80 of the current bundle 40. According to step 208, the server application 124 on the streaming server 140 creates data packets 80 from the files 148 of the stream, where the length and frame data 82 of the packets are in accordance with the MTU of the network 30/communications channel 52 and underlying transport facility. Preferably, the transport facility is RTP.

In step 210, the server 140 pushes the data packets 80 of the stream in an ordered sequence until the specified bundle size 90 of the data packets in the received stream request message 84 is met. The server 140 then sends a message to notify the client application 126 that the last data packet 80 of the bundle 40 has been sent in step 212.

In step 214, the client application 126 stops the local timer and calculates the baud rate of the bundle 40 (e.g. response time 50) using the value of the local timer, and determines the bandwidth utilization of the communications channel 52 by dividing the bundle baud rate of the communications channel 52 by its theoretical bandwidth 52.

According to step 216, the client application 126 determines that the bundle baud rate is within a predetermined low utilization range, in conjunction with detected data packet retransmissions and/or errors that do not exceed a predetermined error threshold. In one example, the low utilization range is between 0 and 60% of the theoretical bandwidth of the communications channel 52, and the predetermined error threshold is 5% of the total number of messages (e.g. control messages and data packets 80) associated with requesting and receiving each bundle 40. Typically, exceeding such an error threshold is indicative of a communications channel 52 that is currently being over-utilized. Because the calculated bandwidth utilization is within the low utilization range with errors and/or retransmissions that do not exceed the error threshold, the client application 126 increases the bundle size 90 in the next stream request message 84 for data packets 80 of the stream from the streaming server 140.

In a specific example, the theoretical bandwidth of a "fast Ethernet" communications channel 52 is 100 MB/sec. If the client application 126 determines that the response time 50 of a bundle 40 is 200 mSec, and the received data packets 80 of the bundle 40 have a combined length or data size of 5 MB, then the bundle baud rate is 5 MB per 200 mSec, or 25 MB/sec. The bandwidth utilization of the communications channel 52 is then 25 MB/Sec/100 MB/Sec, or 25%. The client application 126 also determines that there have been no errors detected on the network interface of the user device 102 and a nominal number of data packet 80 retransmissions that do not exceed the predetermined error threshold. Because the bandwidth utilization is within the predetermined low utilization range and errors/retransmissions are below the threshold value, the client application 126 will automatically increase the bundle size 90 for subsequent stream request messages 84 in an attempt to increase the bandwidth utilized of the communications channel 52.

In step 218, the client application 126 determines the transcode resolution of the frame data 82 of the data packets 80 of the current bundle 40, and in response to user viewing preferences or in response to the determined bandwidth utilization, the client application 126 optionally prepares a transcoding request message to send to the streaming server 140. The transcoding request message includes an adjusted transcode resolution value. In one example, in response to determining that the bandwidth utilized by the communications channel 52 is under-utilized, the client application 126 can specify that the frame data 82 of data packets 80 of the next bundle 40 sent by the streaming server 140 be "up transcoded" to a higher transcode resolution. The client application 126 accomplishes this by upwardly adjusting the determined transcode resolution of the current frame data 82, and including the adjusted transcode resolution value within the transcoding request message.

According to step 220, the client application 126 then sends the transcoding request message including the adjusted transcode resolution from step 218. The server 140 transcodes the frame data 82 in response, in step 222. In one example, in response to the transcoding request message, the streaming server 140 up-transcodes the frame data 82 to a higher resolution to optimize the available bandwidth of the communications channel 52.

Finally, in step 224, the client application 126 sends a stream request message 84 for the next bundle 40 of the stream, where the stream request message 84 includes the increased bundle size 90.

In FIG. 2B, in step 302, the client application 126 sends a stream request message 84 for the next bundle 40 of the stream, where the stream request message 84 includes a current bundle size 90. In step 304, the client application 126 restarts the local timer for determining a bundle baud rate associated with the response time 50 for receiving the data packets 80 of the current bundle 40.

In step 306, the server 140 pushes the data packets 80 of the stream in an ordered sequence until the specified bundle size 90 of the data packets in the received stream request message 84 is met. The server 140 then sends a message to notify the client application 126 that the last data packet 80 of the bundle 40 has been sent in step 308.

According to step 310, the client application 126 stops the local timer and calculates the baud rate of the bundle (e.g. response time 50) from the value of the local timer, and determines the bandwidth utilization of the communications channel 52 by dividing the bundle baud rate by the theoretical bandwidth of the communications channel 52.

In step 312, in response to determining that the bundle baud rate is within a predetermined sufficient utilization range, in conjunction with detected data packet retransmissions and/or errors that do not exceed the predetermined error threshold, the client application 126 maintains the bundle size 90. In step 314, the client application 126 then sends a stream request message 84 for the next bundle 40 of the stream, where the stream request message 84 includes the unchanged bundle size.

In FIG. 2C, in step 402, the client application sends a stream request message 84 to the streaming server 140, where the request message 84 includes a bundle size 90 of data packets 80 of the stream. In step 404, the client application 126 restarts the local timer for determining a bundle baud rate associated with the response time 50 for receiving the data packets 80 of the current bundle 40. According to step 406, the server 140 pushes the data packets 80 of the stream in an ordered sequence until the specified bundle size 90 of the data packets in the received stream request message 84 is met. The server 140 then sends a message to notify the client application 126 that the last data packet 80 of the bundle 40 has been sent in step 408.

In step 410, the client application 126 stops the local timer and calculates the baud rate of the bundle 40 (e.g. response time 50) using the value of the local timer, and determines the bandwidth utilization of the communications channel 52 by dividing the bundle baud rate of the communications channel 52 by its theoretical bandwidth 52.

According to step 412, the client application 126 determines that the bundle baud rate is within a predetermined high utilization range, in conjunction with detected data packet retransmissions and/or errors that exceed the predetermined error threshold. In one example, the high utilization range is between 80 and 100% of the theoretical bandwidth of the communications channel 52. Because the calculated bandwidth utilization is within the high utilization range with errors and/or retransmissions that exceed the error threshold, the client application 126 decreases the bundle size 90 in the next stream request message 84 for data packets 80 of the stream.

In step 414, the client application 126 determines the transcode resolution of the frame data 82 of the data packets 80 of the current bundle 40, and in response to user viewing preferences or in response to the determined bandwidth utilization, the client application 126 optionally prepares a transcoding request message to send to the streaming server 140. The transcoding request message includes an adjusted transcode resolution value. In one example, in response to determining that the bandwidth utilized by the communications channel 52 is over-utilized, the client application 126 can specify that the frame data 82 of data packets 80 of the next bundle 40 sent by the streaming server 140 be "down transcoded" to a lower transcode resolution. The client application 126 accomplishes this by downwardly adjusting the determined transcode resolution of the current frame data 82, and including the adjusted transcode resolution value within the transcoding request message.

According to step 416, the client application 126 then sends the transcoding request message including the adjusted transcode resolution from step 414. The server 140 transcodes the frame data 82 in response, in step 418. In one example, in response to the transcoding request message, the streaming server 140 down-transcodes the frame data 82 for the data packets 80 of the next bundle 40 to a lower resolution to optimize the available bandwidth of the communications channel 52. In step 420, the client application 126 sends a stream request message 84 for the next bundle 40 of the stream, where the stream request message 84 includes the decreased bundle size 90. In step 422, the server 140 optionally culls frames from the next bundle 40 to additionally optimize the bandwidth utilization.

While this invention has been particularly shown and described with references to preferred embodiments thereof, it will be understood by those skilled in the art that various changes in form and details may be made therein without departing from the scope of the invention encompassed by the appended claims.

What is claimed is:

1. A video streaming system, comprising:
    a streaming server that transmits a bundle of data packets of one or more video and/or audio streams over a communications channel in response to stream request messages for each of the streams; and
    a client application that sends the stream request messages, wherein each of the stream request messages includes a bundle size of the bundle of data packets of each stream for the streaming server to transmit.

2. The system of claim 1, wherein the client application optionally adjusts the bundle size in the stream request messages in response to determining an available bandwidth of the communications channel.

3. The system of claim 1, wherein the client application determines an available bandwidth of the communications channel by determining a response time for the client application to receive the bundle of data packets of a stream transmitted by the streaming server.

4. The system of claim 1, wherein the streaming server is a network video recorder.

5. The system of claim 1, wherein the client application executes in a web browser of a user device.

6. The system of claim 1, wherein the communications channel utilizes Real-time Transport (RTP) to reduce fragmentation of the stream request messages sent by the client application and the data packets of the streams transmitted by the streaming server.

7. The system of claim 1, wherein the streaming server transmits the bundle of data packets of the one or more video and/or audio streams over the communications channel via a push mechanism.

8. The system of claim 1, wherein the client application sends a message for the streaming server to adjust a transcode resolution of frame data of the data packets of a subsequent bundle, in response to the client application determining an available bandwidth of the communications channel and determining a transcode resolution of frame data of the data packets of a received bundle.

9. The system of claim 1, wherein the client application sends a message for the streaming server to adjust a transcode resolution of frame data of the data packets of a subsequent bundle, in response to the client application determining an available bandwidth of the communications channel and in response to user viewing preferences.

10. The system of claim 1, wherein the streaming server culls frame data from the data packets of the transmitted bundle to optimize bandwidth of the communications channel.

11. A video streaming method, comprising:
    transmitting a bundle of data packets of one or more video and/or audio streams over a communications channel in response to stream request messages for each of the streams; and
    based on receipt of the bundle of data packets at a client application, updating a size of the bundle specified in subsequent stream request messages.

12. The method of claim 11, wherein each of the stream request messages includes the bundle size of the bundle of data packets of each stream for a streaming server to transmit.

13. The method of claim 11, further comprising adjusting the bundle size in the stream request messages in response to determining an available bandwidth of the communications channel.

14. The method of claim 11, further comprising determining an available bandwidth of the communications channel by determining a response time to receive the bundle of data packets.

15. The method of claim 11, wherein the data packets are sent by a network video recorder.

16. The method of claim 11, wherein the stream request messages are sent by the client application executing in a web browser of a user device.

17. The method of claim 11, wherein the communications channel utilizes Real-time Transport (RTP) to reduce fragmentation of the stream request messages sent by a client application and/or the data packets of the streams transmitted by a streaming server.

18. The method of claim 11, further comprising sending a message to adjust a transcode resolution of frame data of the data packets of a subsequent bundle, in response to determining an available bandwidth of the communications channel and determining a transcode resolution of frame data of the data packets of a received bundle.

19. The method of claim 11, further comprising sending a message to adjust a transcode resolution of frame data of the data packets of a subsequent bundle, in response to user viewing preferences and in response to determining an available bandwidth of the communications channel.

20. The method of claim 11, further comprising culling frame data from the data packets of the transmitted bundle to optimize bandwidth of the communications channel.

* * * * *